US012071329B1

(12) United States Patent
Anderson et al.

(10) Patent No.: US 12,071,329 B1
(45) Date of Patent: Aug. 27, 2024

(54) INSERT FOR AN AERIAL WORK ASSEMBLY

(71) Applicants: Christian Anderson, Huntington Station, NY (US); Ginetta Anderson, Huntington Station, NY (US)

(72) Inventors: Christian Anderson, Huntington Station, NY (US); Ginetta Anderson, Huntington Station, NY (US)

( * ) Notice: Subject to any disclaimer, the term of this patent is extended or adjusted under 35 U.S.C. 154(b) by 0 days.

(21) Appl. No.: 18/540,516

(22) Filed: Dec. 14, 2023

Related U.S. Application Data

(60) Provisional application No. 63/543,518, filed on Oct. 11, 2023.

(51) Int. Cl.
*B66F 11/04* (2006.01)

(52) U.S. Cl.
CPC .................................... *B66F 11/04* (2013.01)

(58) Field of Classification Search
CPC ............................... B66F 11/04; B66F 11/044
See application file for complete search history.

(56) References Cited

U.S. PATENT DOCUMENTS 3,625,305 A * 12/1971 Mueller ................ B66F 11/044 182/2.4
3,642,096 A * 2/1972 Valentine ............. B66F 11/044 182/2.11
3,727,722 A * 4/1973 Hedges ..................... E06C 5/04 182/2.5
5,611,410 A * 3/1997 Baillargeon .......... B66F 11/044 182/2.1
7,806,231 B1 * 10/2010 Jackson ................ B66F 17/006 182/47
8,899,380 B2 * 12/2014 Chard .................. B66F 17/006 182/2.1
9,776,845 B2 * 10/2017 Minke ..................... B66F 11/04
9,851,048 B2 * 12/2017 Higgins ................. F16M 13/02
11,104,563 B1 * 8/2021 Deters ...................... B66F 11/04
11,307,001 B2 * 4/2022 Lynch .................. B66F 17/006

* cited by examiner

*Primary Examiner* — Colleen M Chavchavadze
(74) *Attorney, Agent, or Firm* — Shore IP Group; Sean R. Wilsusen

(57) ABSTRACT

An insert for an aerial work assembly includes a main body configured to be received in an aerial lift bucket. The main body includes first through fourth sides, each defining an outer sidewall and an inner sidewall. The main body includes a bottom portion connected with the first side, the second side, the third side, and the fourth side. An open top is defined at an upper portion of the main body. An interior space is defined in the main body and receives a user. The extension assembly includes a bottom lip extending from the upper portion of the main body. A connecting sidewall extends upwardly from the bottom lip. An upper lip extends from the connecting sidewall. The extension assembly is configured to extend upwardly to extend a height of the main body with respect to the aerial lift bucket.

18 Claims, 9 Drawing Sheets

INSERT FOR AN AERIAL WORK ASSEMBLY

CROSS-REFERENCE TO RELATED APPLICATION

This U.S. Non-Provisional Patent Application claims priority to U.S. Provisional Patent Application No. 63/543,518, the entire contents of which are incorporated by reference herein.

FIELD

The present disclosure relates to an insert and, more particularly, to an insert for an aerial work assembly.

BACKGROUND

An aerial lift (work) assembly, such as an aerial lift bucket, is a specialized piece of equipment, which is commonly used in construction and maintenance tasks that require workers to reach elevated locations safely and efficiently. An aerial lift assembly may also be referred to as an aerial work platform (AWP), a cheery picker, a bucket truck, or a mobile elevating work platform (MEWP).

Aerial lift assemblies are generally employed for temporary, flexible access purposes such as maintenance and construction work or by firefighters for emergency access, which distinguishes aerial lift assemblies from permanent access equipment such as elevators.

Aerial lift assemblies may be fitted with safety or guard rails around the platform itself to contain operators and passengers. This arrangement may be supplemented in some models by a restraining point, designed to secure a safety harness or fall arrester. However, users of such aerial lift assemblies may be relatively tall, and thus enhanced safety features for aerial lift assemblies is desirable, particularly for such taller users.

SUMMARY

Provided in accordance with aspects of the present disclosure is an insert for an aerial work assembly including a main body configured to be received in an aerial lift bucket. The main body includes a first side. The first side defines a first outer sidewall and a first inner sidewall. The main body includes a second side coupled with the first side. The second side defines a first outer sidewall and a second inner sidewall. The main body includes a third side coupled with the second side. The third side defines a third outer sidewall and a third inner sidewall. The main body includes a fourth side coupled with the third side and the first side. The fourth side defines a fourth outer sidewall and a fourth inner sidewall. The main body includes a bottom portion connected with the first side, the second side, the third side, and the fourth side. The bottom portion defines a fifth inner sidewall. The main body includes an upper portion. An open top is defined at the upper portion of the main body by the first side, the second side, the third side, and the fourth side. An interior space is defined by the first inner sidewall, the second inner sidewall, the third inner sidewall, the fourth inner sidewall, and the fifth inner sidewall. The interior space is configured to receive a user. An extension assembly extends from the main body. The extension assembly includes a bottom lip extending from the upper portion of the main body. A connecting sidewall extends upwardly from the bottom lip. An upper lip extends from the connecting sidewall. An opening is defined in the upper lip and the connecting sidewall above the bottom lip. The extension assembly is configured to extend upwardly to extend a height of the main body with respect to the aerial lift bucket.

In an aspect of the present disclosure, the bottom lip defines an upper surface. The upper surface of the bottom lip defines a bottom surface of the opening defined in the upper lip and the connecting sidewall.

In an aspect of the present disclosure, the main body defines a tapered shape including a first width defined by the upper portion of the main body and a second width narrower than the first width defined by a lower portion of the main body.

In an aspect of the present disclosure, the main body defines a number of striations configured to reduce vertical movement of the main body with respect to the aerial lift bucket.

In an aspect of the present disclosure, at least one striation includes an overhang portion configured to overhang an adjacent striation.

In an aspect of the present disclosure, at least one striation includes an angled sidewall configured to face the aerial lift bucket.

In an aspect of the present disclosure, a first width defined by the extension assembly is wider than a second width defined by the upper portion of the main body.

In an aspect of the present disclosure, the main body is configured to be removably inserted into a liner of the aerial lift bucket.

In an aspect of the present disclosure, the bottom lip defines a bottom surface. The bottom surface of the bottom lip is configured to contact an upper surface of the liner of the aerial lift bucket.

In an aspect of the present disclosure, the bottom surface of the bottom lip is configured to contact an upper surface of the aerial work assembly.

In an aspect of the present disclosure, at least one of the bottom lip or the upper lip protrudes radially outwardly with respect to the connecting sidewall.

In an aspect of the present disclosure, the bottom lip is defined circumferentially around the main body.

In an aspect of the present disclosure, the upper lip protrudes radially outwardly from the main body. The upper lip is axially spaced from the bottom lip such that the bottom lip and the upper lip define a recess. The recess extends at least partially around an outer periphery of the extension assembly.

In an aspect of the present disclosure, the interior space is continuously closed on at least five sides.

In an aspect of the present disclosure, the main body and the extension assembly are monolithically formed or coupled to one another.

BRIEF DESCRIPTION OF THE DRAWINGS

Various aspects and features of the present disclosure are described hereinbelow with reference to the drawings wherein.

DETAILED DESCRIPTION

Figure 1:
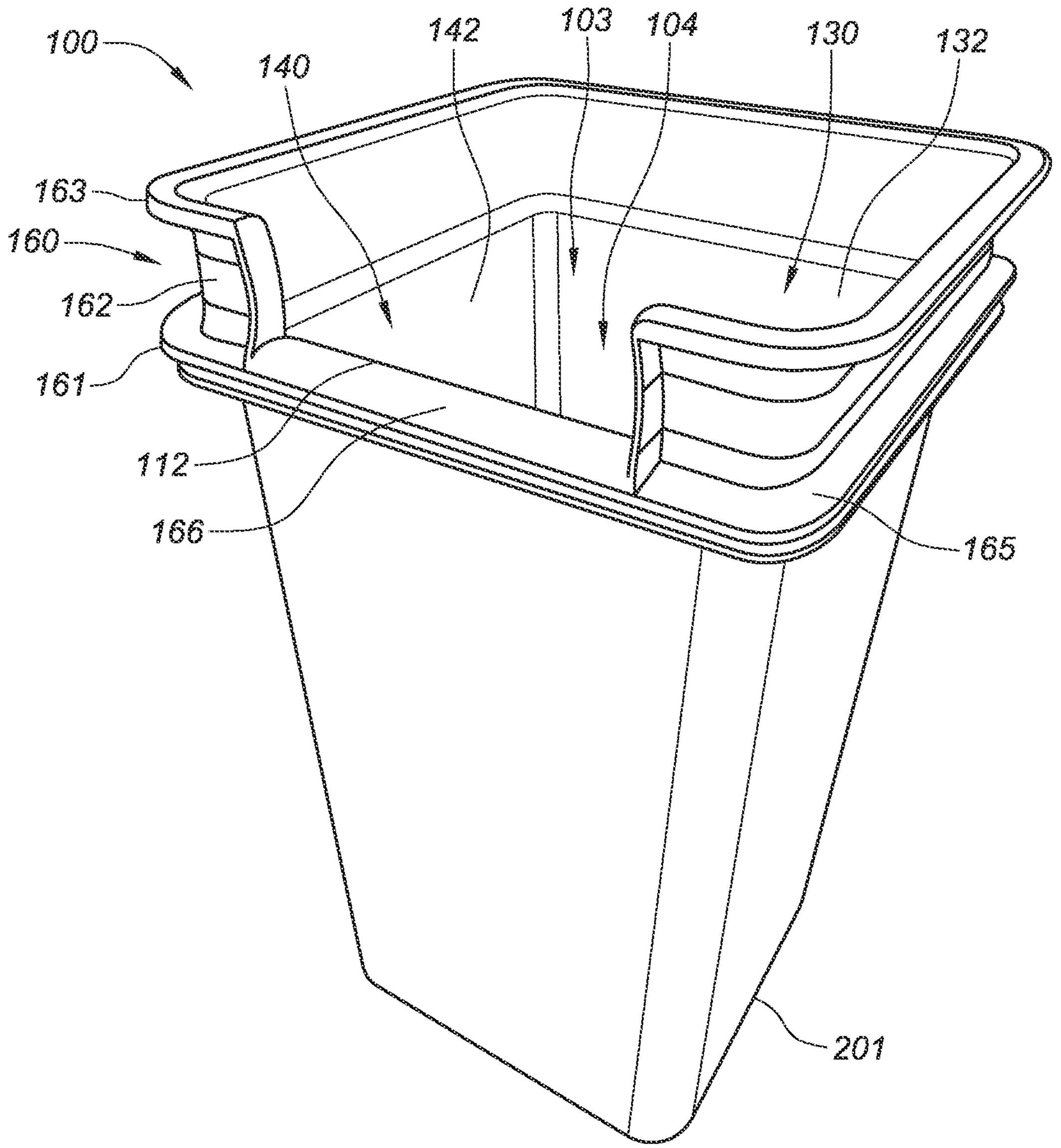
FIG. 1 is a front, perspective view of an insert for an aerial work assembly arranged in a liner for the aerial work assembly according to aspects of the present disclosure.
Figure 2:
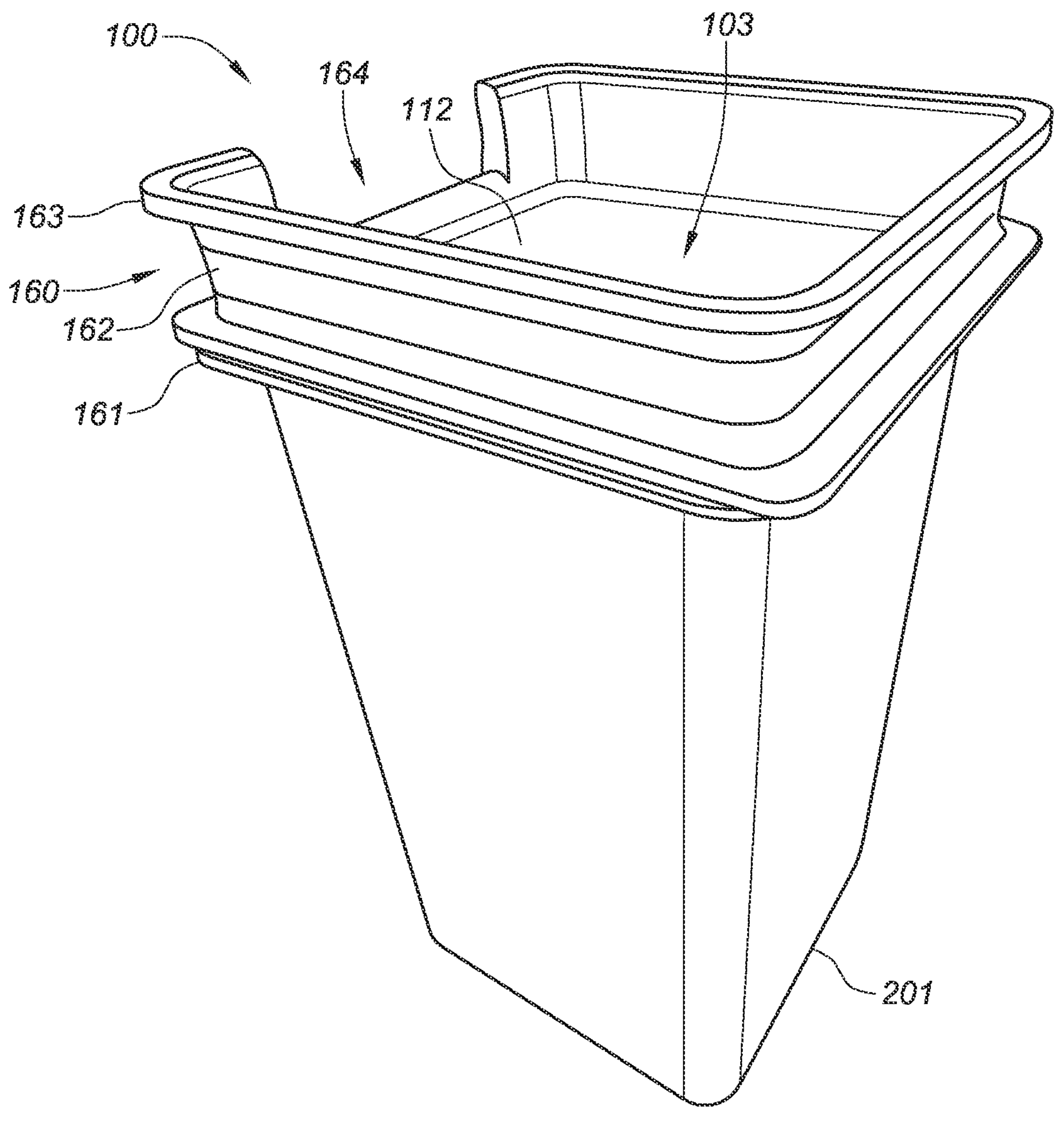
FIG. 2 is a rear, perspective view of the insert for the aerial work assembly of FIG. 1.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The aerial lift assembly described herein may include a lift bucket, such as a fiberglass lift bucket. Alternatively, the aerial lift assembly may include a partially open bucket or support platform, such as a bucket formed of metal railings and a metal floor. The aerial lift assembly may include a liner.

An aerial lift bucket, which may be referred to as a bucket truck or cherry picker, is a specialized vehicle equipped with an extendable mechanical arm or boom and an attached bucket or platform at a distal end of the arm or boom. An aerial lift bucket is commonly used for tasks that require workers to access elevated areas, such as utility maintenance, tree trimming, construction, and outdoor signage installation.

The aerial lift bucket may include a boom. A boom is generally a large, extendable arm that allows the bucket to reach high and often difficult-to-access places. Booms can be articulated, telescopic, or a combination of both, providing flexibility in reaching different heights and angles. The aerial lift bucket may include a bucket (which may include a liner) or a platform. The bucket is typically enclosed for safety and may include features such as guardrails and controls for adjusting the position of the platform.

The aerial lift bucket may include controls, such as controls that allow the operator or user to manipulate the movement of the boom and the position of the bucket. These controls are generally located in a panel within the bucket and may include, for example, levers, buttons, or a joystick.

The aerial lift bucket may include one or more stabilizer and/or outriggers (e.g., extendable supports) to provide stability to the bucket while the bucket is in use, aerial lift trucks are often equipped with stabilizers or outriggers. The extendable supports can be deployed to provide a wider base and prevent a vehicle from tipping over.

The aerial lift bucket may include a power source such as, for example, diesel engines, gasoline engines, or electric motors.

The aerial lift bucket may include a hydraulic system. The movement of the boom and the bucket can be controlled by the hydraulic system. This system allows for precise and controlled adjustments to the position of the bucket or platform.

The insert 100 described herein may be inserted into an aerial work assembly, such as into a liner of the aerial work assembly (see, e.g., liner 201) or into a bucket of the aerial work assembly.

Referring generally to FIGS. 1 to 9, an insert for an aerial work assembly 100 includes a main body 101 configured to be received in an aerial lift bucket (e.g., in an insert 201 of an aerial lift bucket).

The main body 101 includes a first side 110. The first side 110 defines a first outer sidewall 111 and a first inner sidewall 112. The main body 101 includes a second side 120 coupled with the first side 110. The second side 120 defines a first outer sidewall 121 and a second inner sidewall 122. The main body 101 includes a third side 130 coupled with the second side 120. The third side 130 defines a third outer sidewall 131 and a third inner sidewall 132. The main body 101 includes a fourth side 140 coupled with the third side 130 and the first side 110. The fourth side 140 defines a fourth outer sidewall 141 and a fourth inner sidewall 142. The main body 101 includes a bottom portion 150 connected with the first side 110, the second side 120, the third side 130, and the fourth side 140. The bottom portion 150 defines a fifth inner sidewall 152. The fifth inner sidewall 152 may define a floor of the main body 101.

Figure 9:
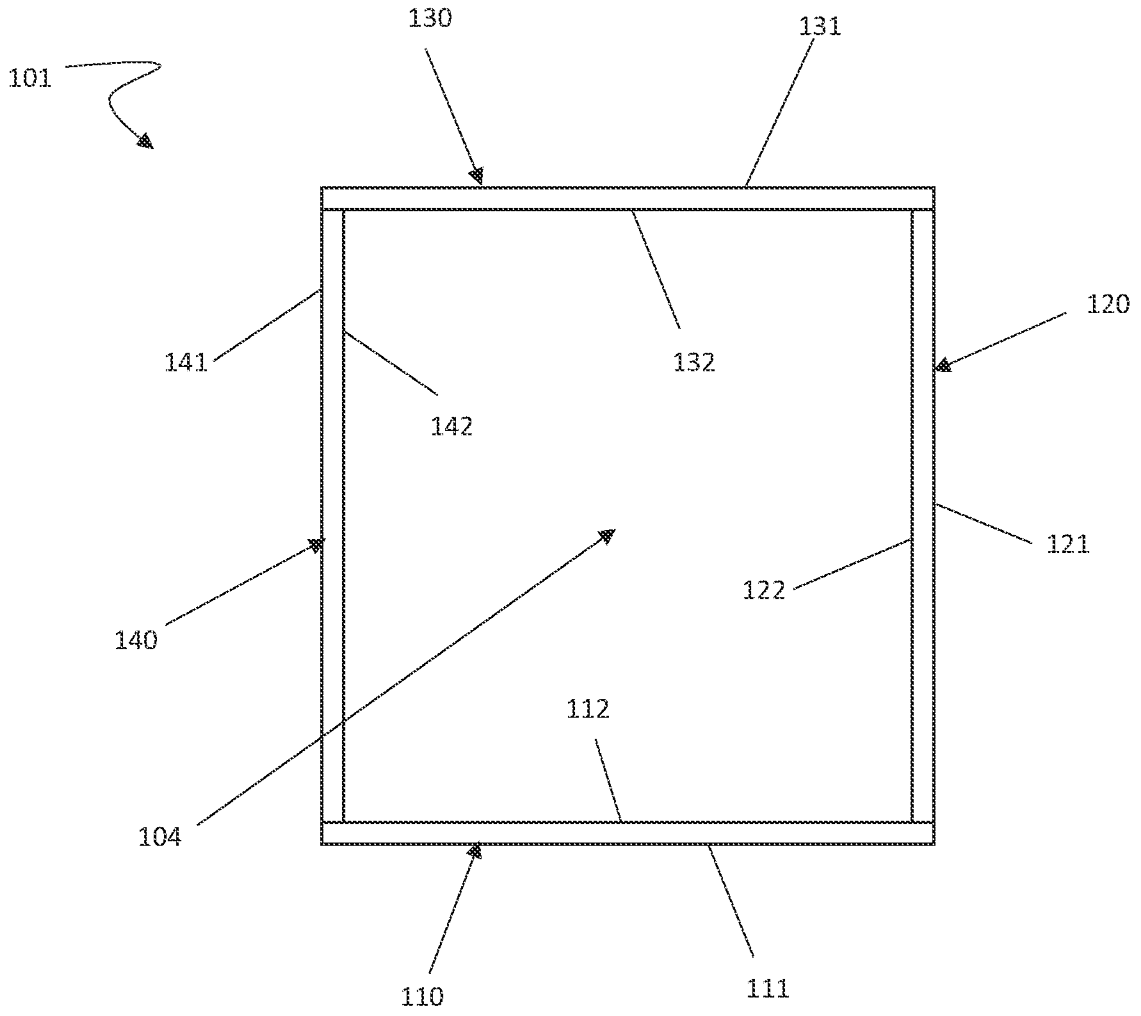
FIG. 9 is a top plan view of the cross-section taken along line B-B' in FIG. 5.

As an example, the main body 101 may define a substantially square or rectangular shape (e.g., when viewed from above or below—see, e.g., line cross-section 510 along line B-B' in FIG. 9). However, alternative shapes may also be employed, such as spherical, or partially spherical shapes.

The main body 101 includes an upper portion 102. An open top 103 is defined at the upper portion 102 of the main body 101 by the first side 110, the second side 120, the third side 130, and the fourth side 140. An interior space 104 is defined by the first inner sidewall 112, the second inner sidewall 122, the third inner sidewall 132, the fourth inner sidewall 142, and the fifth inner sidewall 152. The interior space 104 is configured to receive a user. That is, a user occupies the interior space 104 while an aerial work assembly is in operation.

An extension assembly 160 extends from the main body 101. The extension assembly 160 includes a bottom lip 161 extending from the upper portion 102 of the main body 101. A connecting sidewall 162 extends upwardly from the bottom lip 161. An upper lip 163 extends from the connecting sidewall 162. An opening 164 is defined in the upper lip 163 and the connecting sidewall 162 above the bottom lip 161. The extension assembly 160 is configured to extend upwardly to extend a height of the main body 101 with respect to the aerial lift bucket (e.g., with respect to the liner 201 of the aerial lift bucket).

In use, the extension assembly 160 provides a relatively higher surface for a user to lean against, and to prevent the user from falling out of the aerial work assembly. The opening 164 defined in the upper lip 163 and the connecting sidewall 162 above the bottom lip 161 allows the user to access controls for the aerial lift assembly. The upper lip 163 may extend downward to connect with the bottom lip 161 to form side surfaces of the opening 164.

Figure 3:
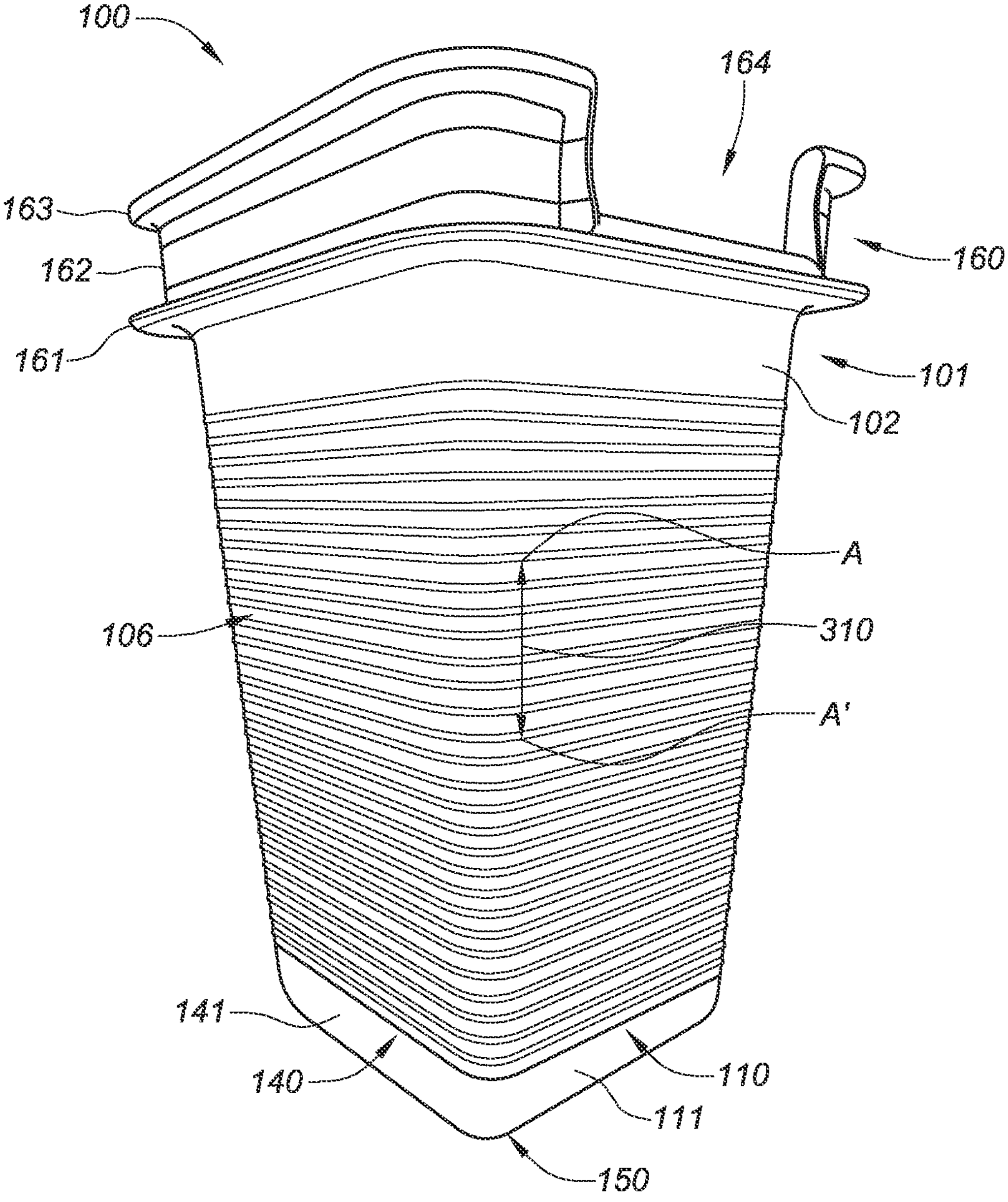
FIG. 3 is a front, perspective view of the insert for the aerial work assembly separated from the liner of the aerial work assembly.
Figure 5:
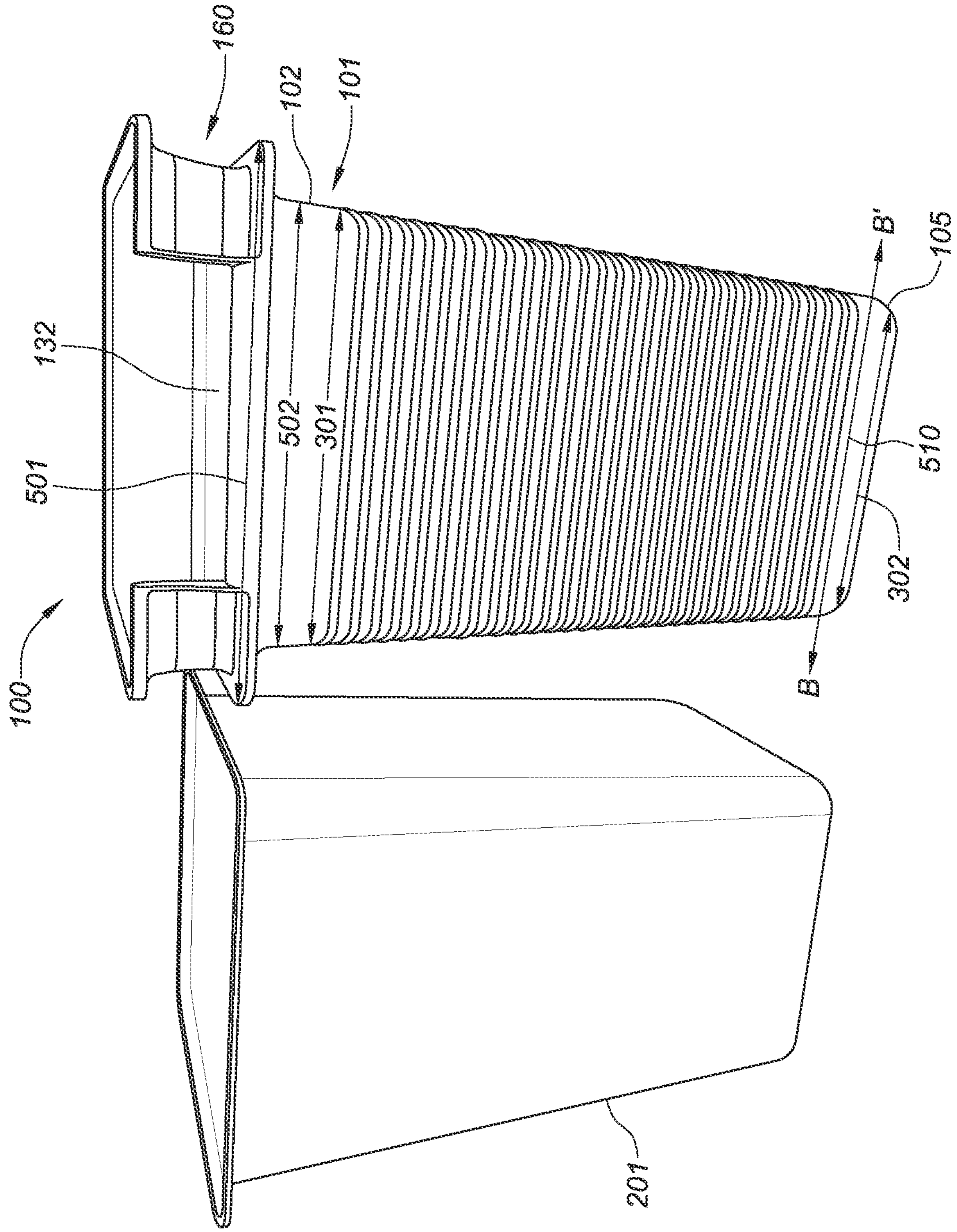
FIG. 5 is a front view of the insert for the aerial work assembly of FIG. 1 and the liner of FIG. 1 in a separated configuration.
Figure 6:
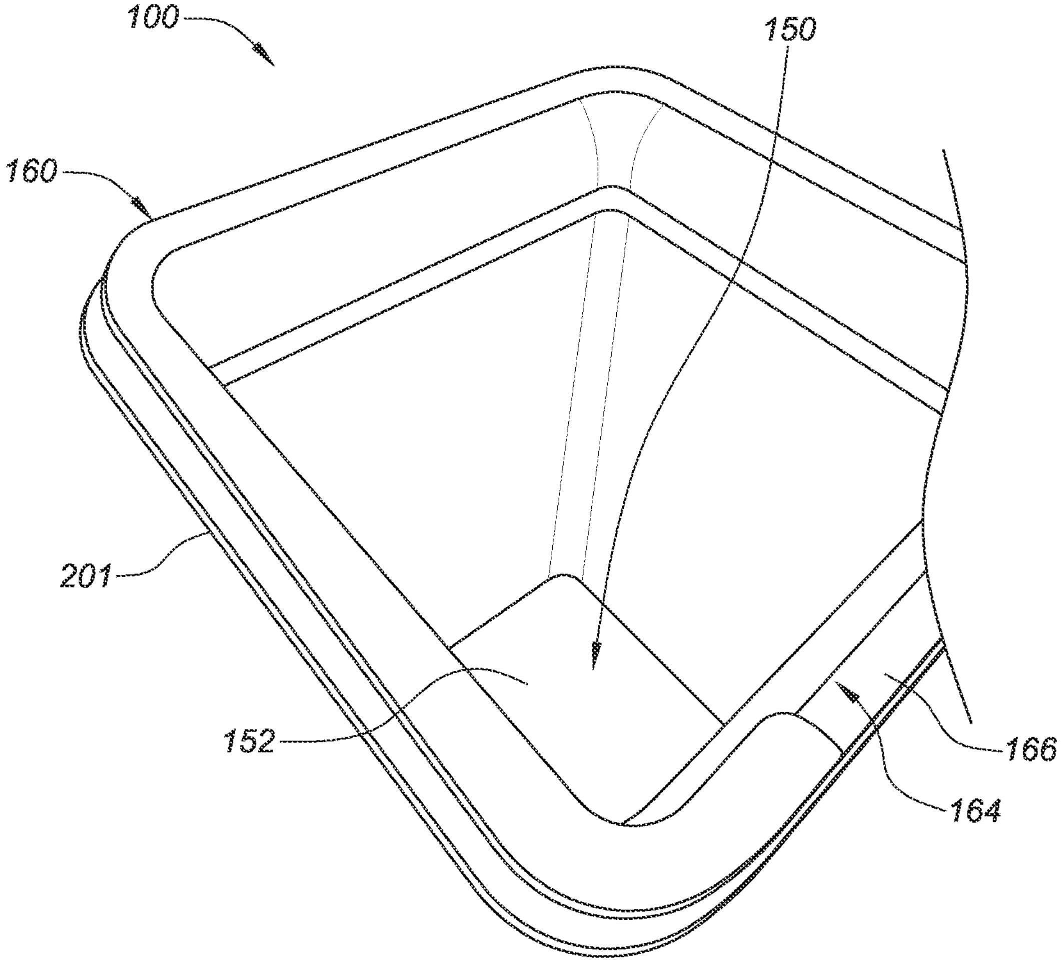
FIG. 6 is an angled, top-down view of the insert for the aerial work assembly of FIG. 1 arranged in the liner of FIG. 1.
Figure 7:
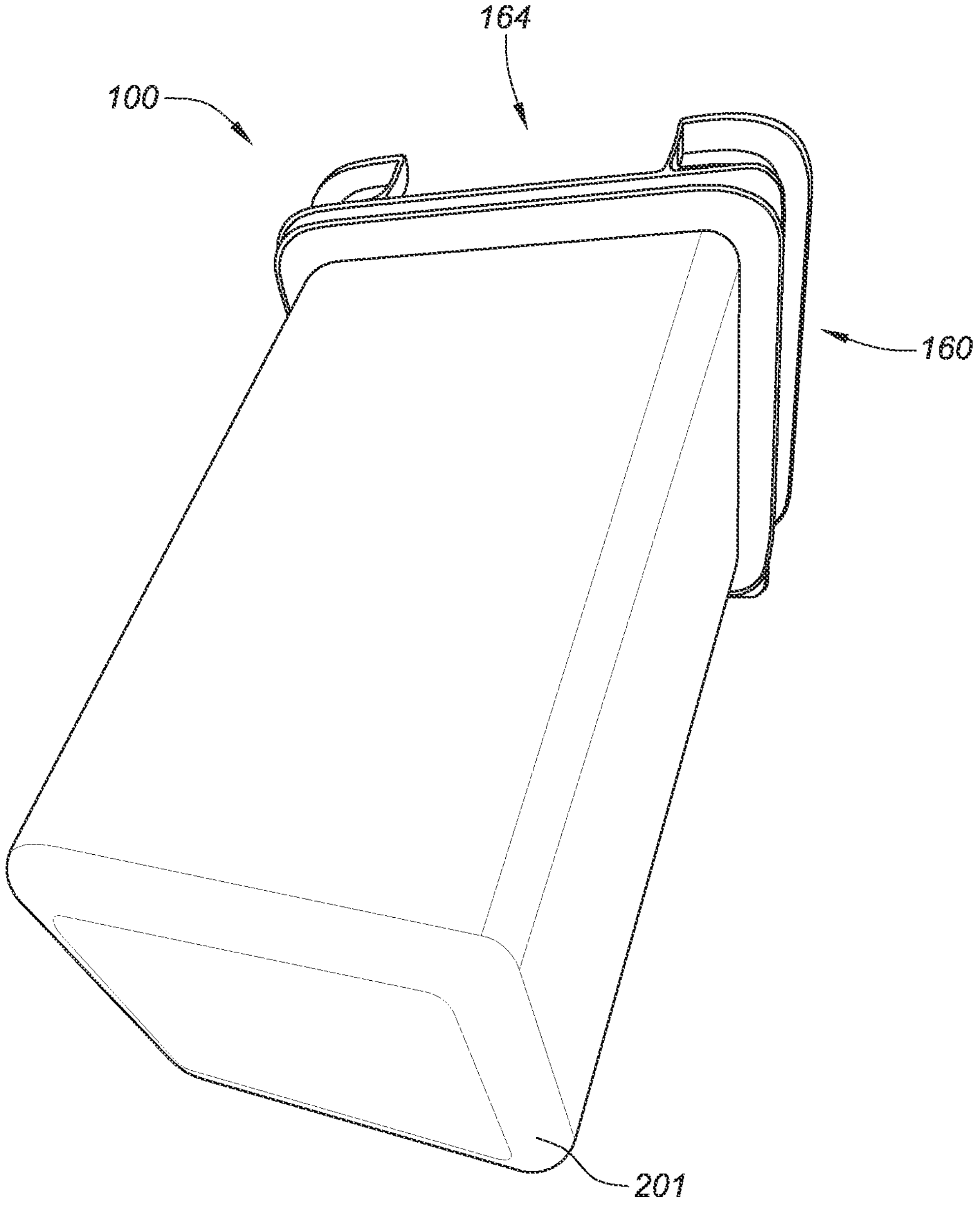
FIG. 7 is an angled, bottom-up view of the insert for the aerial work assembly of FIG. 1 arranged in the liner of FIG. 1.

Referring particularly to FIGS. 3 and 5, the main body 101 defines a tapered shape including a first width 301 defined by the upper portion 102 of the main body 101 and a second width 302 narrower than the first width defined by a lower portion 105 of the main body 101. The tapered shape of the main body 101 allows the insert 100 to be inserted into an aerial lift assembly, such as a liner 201 for the aerial lift assembly or a bucket of the aerial lift assembly. A bucket of an aerial lift assembly may have substantially the same shape and configuration as the liner 201. That is, the shape of the main body 101 of the insert 100 corresponds with the shape of the aerial lift assembly, such as a shape of the liner 201 of the aerial lift assembly or the bucket of the aerial lift assembly.

Figure 4:
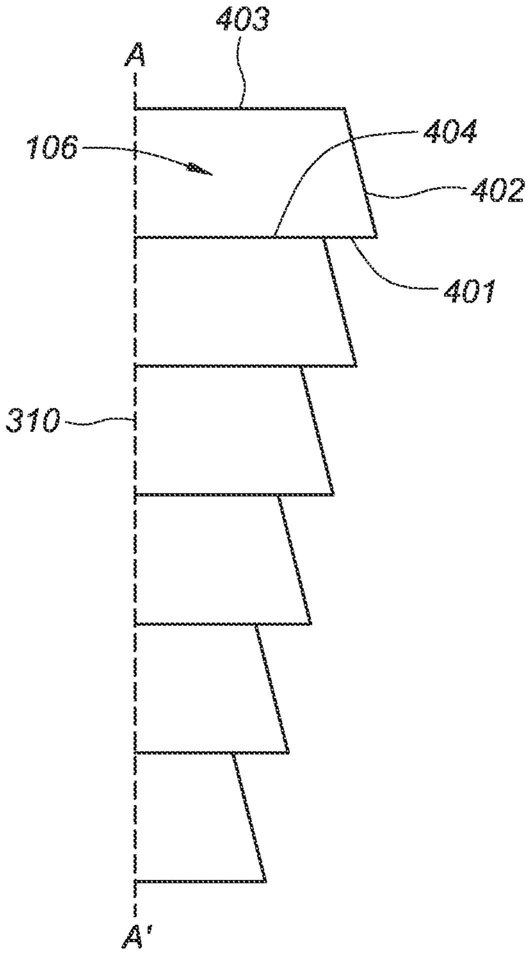
FIG. 4 is an enlarged, cross-sectional view along line A-A' of FIG. 3.

Referring particularly to FIGS. 3 to 4, the main body 101 defines a number of striations 106 configured to reduce vertical movement of the main body 101 with respect to the liner 201 of an aerial lift bucket. The striations 106 are configured to directly contact inner sidewalls of an insert 201 of an aerial lift assembly. The striations 106 may each continuously extend circumferentially around the main body 101. Each of the striations 106 may have the configuration described below with reference to FIG. 4.

FIG. 4 is an enlarged, cross-sectional view along line 310 traversing area A-A' in FIG. 3. Referring particularly to FIG. 4, at least one striation 106 includes an overhang portion 401 configured to overhang an adjacent striation 106. At least one striation 106 includes an angled sidewall 402 configured to face the liner 201 of the aerial lift bucket (e.g., configured to face an inner sidewall of the liner 201). While 6 striations are illustrated along line 310, each of the striations 106 illustrated in FIG. 3 may have substantially the same arrangement as each other. The angled sidewall(s) 402 defines a relatively narrower upper portion 403 and a relatively wider lower portion 404. This arrangement creates the overhang(s) 401. The tapered shape of the main body 101 further increases the degree of overhang of overhangs 401 with respect to the outer sidewalls 111, 121, 131, and 141 of the main body 101. That is, the striations 106 project away from the outer sidewalls 111, 121, 131, and 141 of the main body 101. The projections 106 may be arranged along substantially the entire vertical length of the main body 101.

In use, the arrangement of the striations 106 supports insertion of the insert 100 into the aerial lift assembly (e.g., into the liner 201 of the aerial lift assembly), while also preventing or eliminating unwanted lifting or removal of the insert 100 from the aerial lift assembly (e.g., from the liner 201 of the aerial lift assembly). That is, the striations 106 provide a gripping surface the makes vertical movement of the insert 100 along an inner sidewall of the aerial lift assembly (e.g., along the inner sidewall of the liner 201 of the aerial lift assembly) somewhat more difficult, thereby preventing unwanted vertical movement of the insert 100, and increasing a strength of the connection between the insert 100 and the aerial lift assembly (e.g., the liner 201 of the aerial lift assembly), while also allowing the insert 100 to be removably arranged in the aerial lift assembly (e.g., in the liner 201 of the aerial lift assembly).

Referring particularly to FIGS. 1 and 5 to 8, the bottom lip 161 defines an upper surface 165. The upper surface 165 of the bottom lip 161 defines a bottom surface 166 of the opening 164 defined in the upper lip 163 and the connecting sidewall 162.

Referring particularly to FIG. 5, a first width 501 defined by the extension assembly 160 is wider than a second width 502 defined by the upper portion 102 of the main body 101. This allows the extension assembly 160 (in particular, the bottom lip 161 of the extension assembly 160) to overhang the uppermost end (e.g., the upper surface 267) of the aerial lift assembly (e.g., the liner 201 of the aerial lift assembly).

Figure 8:
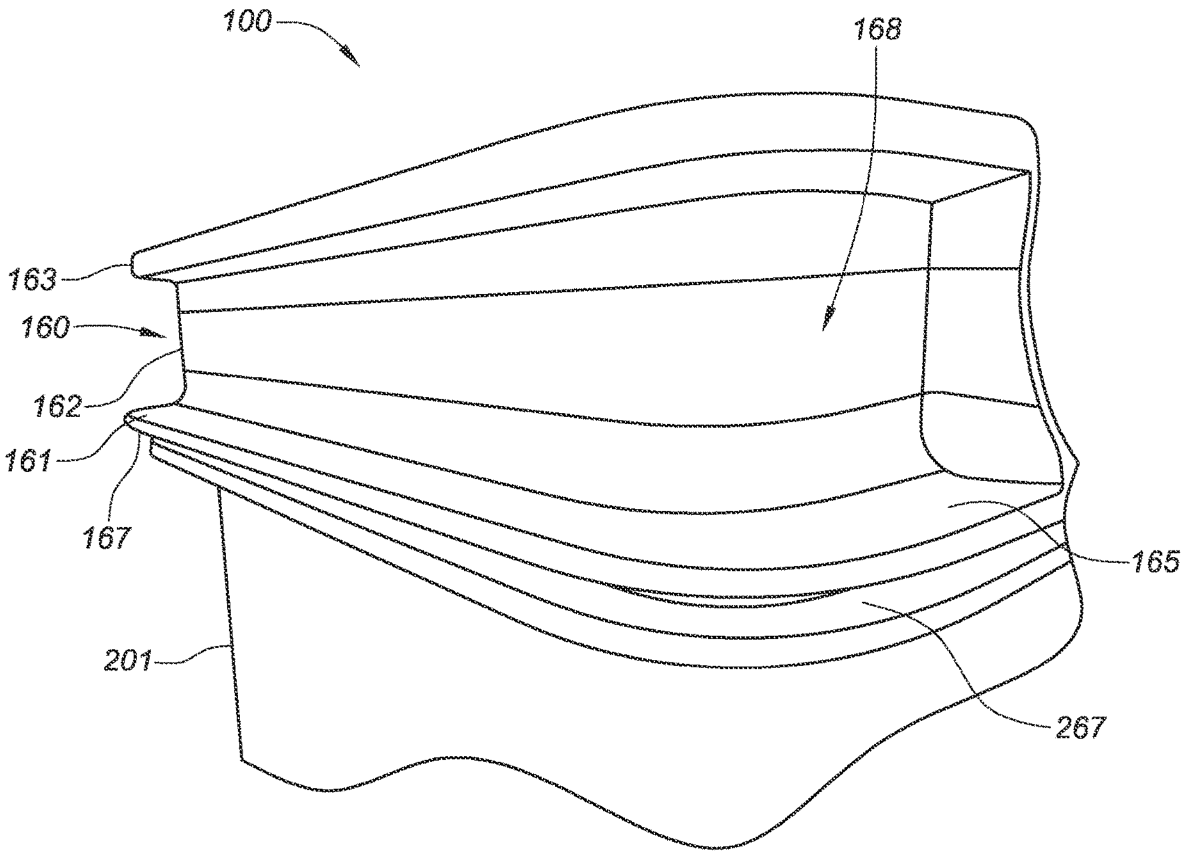
FIG. 8 is an enlarged, perspective view of the extension assembly of the insert for the aerial work assembly of FIG. 1.

Referring particularly to FIG. 8, the bottom lip 161 defines a bottom surface 167. The bottom surface 167 of the bottom lip 161 is configured to contact an upper surface 267 of the liner 201 of the aerial lift bucket. The upper surface 267 of the liner 201 of the aerial lift bucket may define a lip having substantially the same width as the width of the bottom lip 167.

In an aspect of the present disclosure, the bottom surface 167 of the bottom lip 161 is configured to contact an upper surface of the aerial work assembly, such as when the liner 201 of the aerial lift assembly is omitted.

With ongoing reference to FIG. 8, in particular, at least one of the bottom lip 161 or the upper lip 163 protrudes radially outwardly with respect to the connecting sidewall 162.

In an aspect of the present disclosure, the bottom lip 161 is defined circumferentially around the entire main body 101.

In an aspect of the present disclosure, the upper lip 163 protrudes radially outwardly with respect to the main body 101. The upper lip 163 is axially spaced from the bottom lip 161 such that the bottom lip 161 and the upper lip 163 define a recess 168 between the bottom lip 161 and the upper lip 163. The recess 168 extends at least partially around an outer periphery of the extension assembly 160.

Referring generally to FIGS. 1 to 9, the interior space 104 is continuously closed on at least five sides. That is, the floor (e.g., the fifth inner sidewall 152) of the insert 100 connects with all four inner sidewalls 112, 122, 132, and 142 to create an enclosed bottom portion 105 of the insert 100. The closed floor (e.g., the outer sidewall of the closed floor) may directly contact a floor of the aerial lift assembly, such as a floor of a liner 201 of the aerial lift assembly.

In an aspect of the present disclosure, the main body 101 and the extension assembly 160 are monolithically formed (e.g., as a single integrally formed structure) or are coupled to one another as two separate structures. That is, the insert 100 may define a single integrally formed structure including the main body 101, and the extension assembly 160.

The insert 100 described herein may be formed of or may include fiberglass. Alternatively, the insert may be formed of or may include plastic or a polymer.

The phrases "aerial lift assembly" and "aerial lift bucket" may be used interchangeably herein.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. An insert for an aerial work assembly, comprising:
- a main body configured to be received in an aerial lift bucket, the main body including:
  - a first side, wherein the first side defines a first outer sidewall and a first inner sidewall;
  - a second side coupled with the first side, wherein the second side defines a first outer sidewall and a second inner sidewall;
  - a third side coupled with the second side, wherein the third side defines a third outer sidewall and a third inner sidewall;

a fourth side coupled with the third side and the first side, wherein the fourth side defines a fourth outer sidewall and a fourth inner sidewall;

a bottom portion connected with the first side, the second side, the third side, and the fourth side, wherein the bottom portion defines a fifth inner sidewall;

an upper portion;

an open top defined at the upper portion of the main body by the first side, the second side, the third side, and the fourth side;

an interior space defined by the first inner sidewall, the second inner sidewall, the third inner sidewall, the fourth inner sidewall, and the fifth inner sidewall, wherein the interior space is configured to receive a user therein; and a plurality of striations configured to reduce vertical movement of the main body with respect to the aerial lift bucket, wherein the striations of the plurality of striations are horizontally and circumferentially arranged around the main body; and an extension assembly extending from the main body, the extension assembly including:

a bottom lip extending from the upper portion of the main body;

a connecting sidewall extending upwardly from the bottom lip;

an upper lip extending from the connecting sidewall; and an opening defined in the upper lip and the connecting sidewall above the bottom lip, wherein the extension assembly is configured to extend upwardly to extend a height of the main body with respect to the aerial lift bucket.

2. The insert of claim 1, wherein the bottom lip defines an upper surface, and wherein the upper surface of the bottom lip defines a bottom surface of the opening defined in the upper lip and the connecting sidewall.

3. The insert of claim 1, wherein the main body defines a tapered shape including a first width defined by the upper portion of the main body and a second width narrower than the first width defined by a lower portion of the main body.

4. The insert of claim 1, wherein at least one striation of the plurality of striations includes an overhang portion configured to overhang a striation of the plurality of striations that is adjacent the at least one striation of the plurality of striations.

5. The insert of claim 4, wherein the at least one striation of the plurality of striations includes an angled sidewall configured to face the aerial lift bucket.

6. The insert of claim 1, wherein a first width defined by the extension assembly is wider than a second width defined by the upper portion of the main body.

7. The insert of claim 1, wherein the main body is configured to be removably inserted into a liner of the aerial lift bucket.

8. The insert of claim 7, wherein the bottom lip defines a bottom surface, and wherein the bottom surface of the bottom lip is configured to contact an upper surface of the liner of the aerial lift bucket.

9. The insert of claim 1, wherein the bottom lip defines a bottom surface, and wherein the bottom surface of the bottom lip is configured to contact an upper surface of the aerial work assembly.

10. The insert of claim 1, wherein at least one of the bottom lip or the upper lip protrudes radially outwardly with respect to the connecting sidewall.

11. The insert of claim 1, wherein the bottom lip is defined circumferentially around the main body.

12. The insert of claim 1, wherein the upper lip protrudes radially outwardly from the main body, wherein the upper lip is axially spaced from the bottom lip such that the bottom lip and the upper lip define a recess therebetween, the recess extending at least partially around an outer periphery of the extension assembly.

13. The insert of claim 1, wherein the interior space is continuously closed on at least five sides.

14. The insert of claim 1, wherein the main body and the extension assembly are monolithically formed or coupled to one another.

15. An insert for an aerial work assembly, comprising:

a main body configured to be received in a liner of an aerial lift bucket, the main body including:

a first side, wherein the first side defines a first outer sidewall and a first inner sidewall;

a second side coupled with the first side, wherein the second side defines a first outer sidewall and a second inner sidewall;

a third side coupled with the second side, wherein the third side defines a third outer sidewall and a third inner sidewall;

a fourth side coupled with the third side and the first side, wherein the fourth side defines a fourth outer sidewall and a fourth inner sidewall, wherein the first side, the second side, the third side, and the fourth side are configured to directly contact an inner surface of the liner of the aerial lift bucket;

a bottom portion connected with the first side, the second side, the third side, and the fourth side, wherein the bottom portion defines a fifth inner sidewall;

an upper portion;

an open top defined at the upper portion of the main body by the first side, the second side, the third side, and the fourth side;

an interior space defined by the first inner sidewall, the second inner sidewall, the third inner sidewall, the fourth inner sidewall, and the fifth inner sidewall, wherein the interior space is configured to receive a user therein; and a plurality of striations configured to reduce vertical movement of the main body with respect to the aerial lift bucket, wherein the striations of the plurality of striations are horizontally and circumferentially arranged around the main body; and an extension assembly extending from the main body, the extension assembly including:

a bottom lip extending from the upper portion of the main body;

a connecting sidewall extending upwardly from the bottom lip;

an upper lip extending from the connecting sidewall; and an opening defined in the upper lip and the connecting sidewall above the bottom lip, wherein the extension assembly is configured to extend upwardly to extend a height of the main body with respect to the liner of the aerial lift bucket.

16. The insert of claim 15, wherein the bottom lip defines an upper surface, and wherein the upper surface of the bottom lip defines a bottom surface of the opening defined in the upper lip and the connecting sidewall.

17. The insert of claim 15, wherein the main body defines a tapered shape including a first width defined by the upper portion of the main body and a second width narrower than the first width defined by a lower portion of the main body.

18. The insert of claim 15, wherein at least one striation of the plurality of striations includes an overhang portion configured to overhang a striation of the plurality of striations that is adjacent the at least one striation of the plurality of striations.

* * * * *